United States Patent [19]
Omiya

[11] Patent Number: 6,094,534
[45] Date of Patent: Jul. 25, 2000

[54] LENS BARREL OF CAMERA

[75] Inventor: Akio Omiya, Omiya, Japan

[73] Assignee: Fuji Photo Optical Co., Ltd., Saitama, Japan

[21] Appl. No.: 09/239,803

[22] Filed: Jan. 29, 1999

[30] Foreign Application Priority Data

Jan. 30, 1998 [JP] Japan .................................. 10-019852

[51] Int. Cl.[7] ............................ G03B 17/00; G02B 15/14
[52] U.S. Cl. ............................................. 396/72; 359/700
[58] Field of Search .............................. 396/72, 79, 144; 359/700, 701, 699

[56] References Cited

U.S. PATENT DOCUMENTS

| 4,386,829 | 6/1983 | Sumi | 359/699 |
|---|---|---|---|
| 5,586,467 | 12/1996 | Weber | 359/700 |
| 5,867,740 | 2/1999 | Hamasaki | 396/144 |
| 5,907,439 | 5/1999 | Matsui | 359/700 |

*Primary Examiner*—W. B. Perkey
*Attorney, Agent, or Firm*—Birch, Stewart, Kolasch & Birch, LLP

[57] ABSTRACT

A first cam groove for driving a lens holding frame along the optical axis is formed in the internal circumferential surface of a rotatable cylinder supporting the lens holding frame therein. A first cam follower provided at the lens holding frame engages with the first cam groove. A second cam groove is formed in the internal circumferential surface of the rotatable cylinder along the first cam groove. A guide member is inserted in the rotatable cylinder movably along the optical axis and is provided with a second cam follower engaging with the second cam groove. A tension spring is stretched between the lens holding frame and the guide member. This causes the lens holding frame to be always pressed forward.

8 Claims, 5 Drawing Sheets

F I G. 4
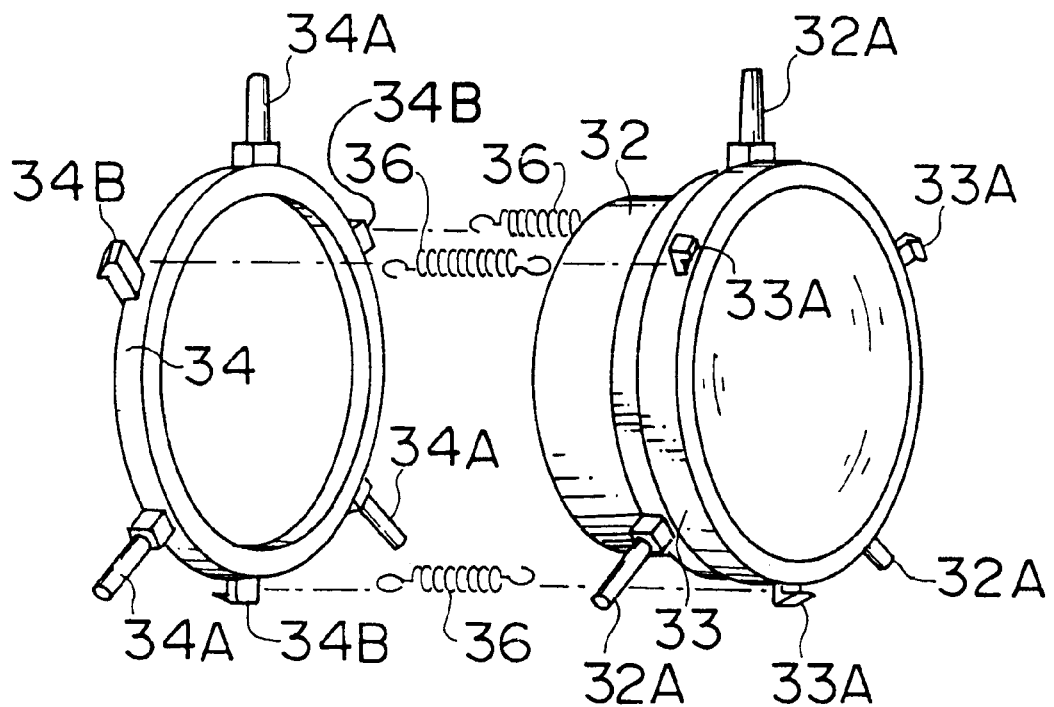

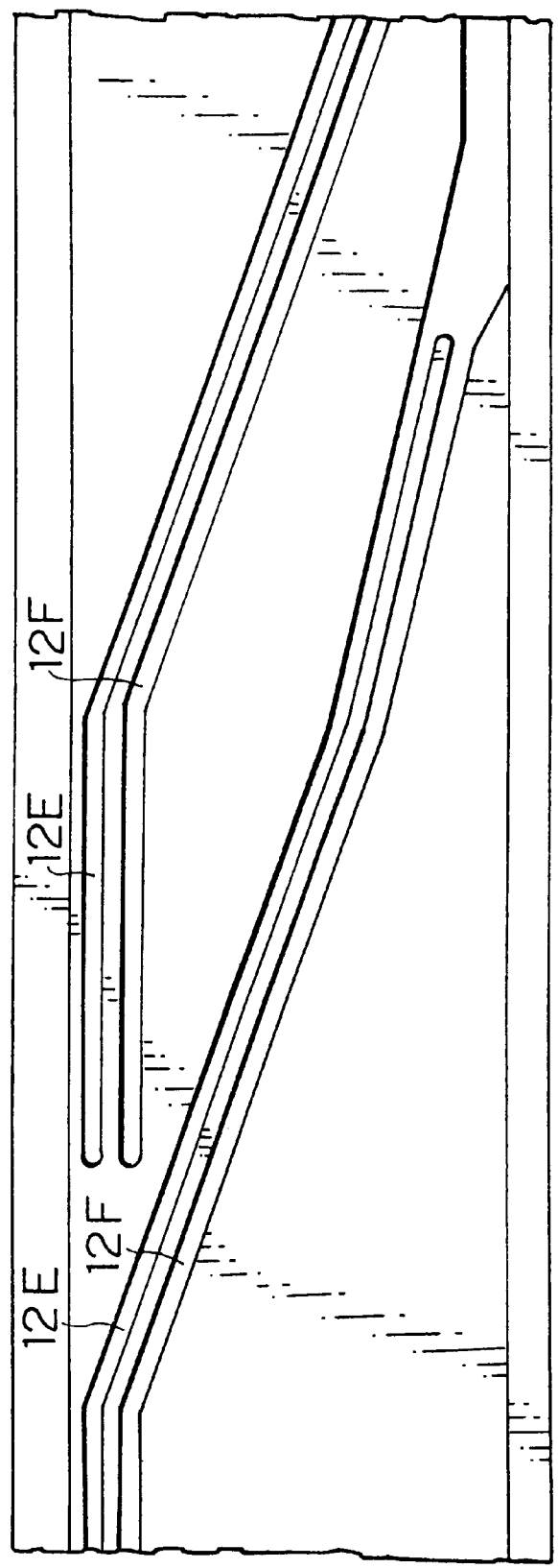
F I G. 5

LENS BARREL OF CAMERA

BACKGROUND OF THE INVENTION

1. Field of the Invention

The present invention relates generally to a lens barrel of a camera, and more particularly to a lens barrel of a camera, in which a cam groove is formed in an internal circumferential surface of a rotatable cylinder of the lens barrel, and a cam follower of a lens holding frame engages with the cam groove so that the lens holding frame can move forward and backward within the rotatable cylinder upon rotating of the rotatable cylinder.

2. Description of Related Art

In order to change a focal length, a conventional zoom lens of a camera moves two or more lens groups relatively to one another by a cam mechanism arranged within a rotatable cylinder supporting the lens group therein. The conventional cam mechanism is constructed in such a way that a cam groove is formed in the internal circumferential surface of the rotatable cylinder, and a cam follower provided on a lens holding frame, which holds a lens, engages with the cam groove. The rotation of the rotatable cylinder causes the cam follower and the lens holding frame to move forward and backward along the cam groove within the rotatable cylinder. The rotatable cylinder is fitted in another cylinder that is fixed or movable. A helicoidal thread formed on the external circumferential surface of the rotatable cylinder engages with a helicoidal thread formed on the internal circumferential surface of the other cylinder, so that the rotatable cylinder moves forward and backward with respect to the other cylinder upon being rotated.

Conventionally, the looseness between the cam follower and the cam groove causes the cam follower to come in contact with one of the front edge and the rear edge of the cam groove dependently upon the rotational direction of the rotatable cylinder. Hence, even if the rotatable cylinder is located at the same position of a rotational angle, the position of the lens holding frame varies dependently upon the past rotational direction of the rotatable cylinder. As a means to solve this problem, there is a well-known pressing mechanism, which always presses the lens holding frame forward or backward with respect to the rotatable cylinder in order to always press the cam follower against the front or rear edge of the cam groove independent of the rotational direction of the rotatable cylinder. For example, the tension spring presses the lens holding frame backward with respect to the rotatable cylinder so that the cam follower can always be in contact with the back edge of the cam groove.

However, this pressing mechanism using the tension spring has a disadvantage in that the drawing force of the spring is different between a wide side and a telephoto side of the zoom lens, thus causing a great change in the rotational load during the rotation of the rotatable cylinder.

SUMMARY OF THE INVENTION

The present invention has been developed in view of the above-described circumstances, and has as its object the provision of a lens barrel of a camera, which causes only a small change in the load during the rotation of the rotatable cylinder and moves the lens holding frame smoothly.

To achieve the above-mentioned object, the present invention is directed to a lens barrel of a camera comprising: a lens holding frame for holding a lens, the lens holding frame having a first cam follower; a guide member having a second cam follower; a rotatable cylinder for supporting the lens holding frame and the guide member therein, the rotatable cylinder being provided with a first cam groove and a second cam groove in an internal circumferential surface thereof, the first cam groove and the second cam groove being along one another, the first cam follower engaging with the first cam groove and the second cam follower engaging with the second cam groove, the lens holding frame and the guide member separately moving within the rotatable cylinder along an optical axis of the lens upon rotating of the rotatable cylinder; and a pressing member for pressing the lens holding frame and the guide member in one of directions as to become closer to one another and as to become farther from one another.

According to the present invention, the force of the pressing member is constant regardless of the position of the lens holding frame, and there is only a small change in the load during the rotation of the rotatable cylinder. Therefore, the lens holding frame can be moved smoothly.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 is an exploded perspective view illustrating the structure of a rear lens group holding frame and a guide member; and FIG. 5 is a development illustrating cam grooves formed in the internal circumferential surface of a rotatable cylinder.

DETAILED DESCRIPTION OF THE PREFERRED EMBODIMENT

This invention will be described in further detail by way of example with reference to the accompanying drawings.

Figure 1:
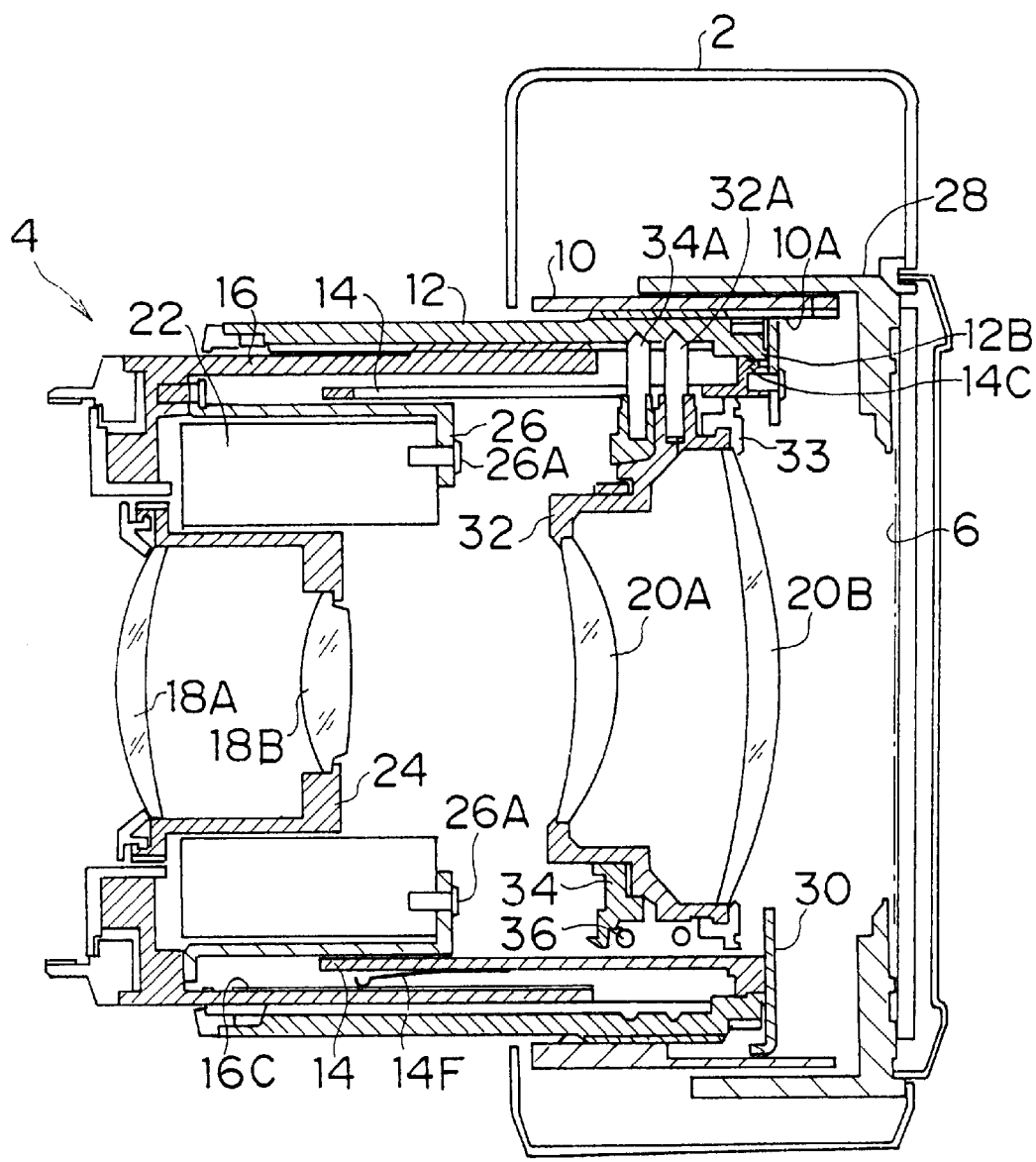
FIG. 1 is a sectional view of a lens barrel according to an embodiment of the present invention at a collapsing position in a camera.
Figure 2:
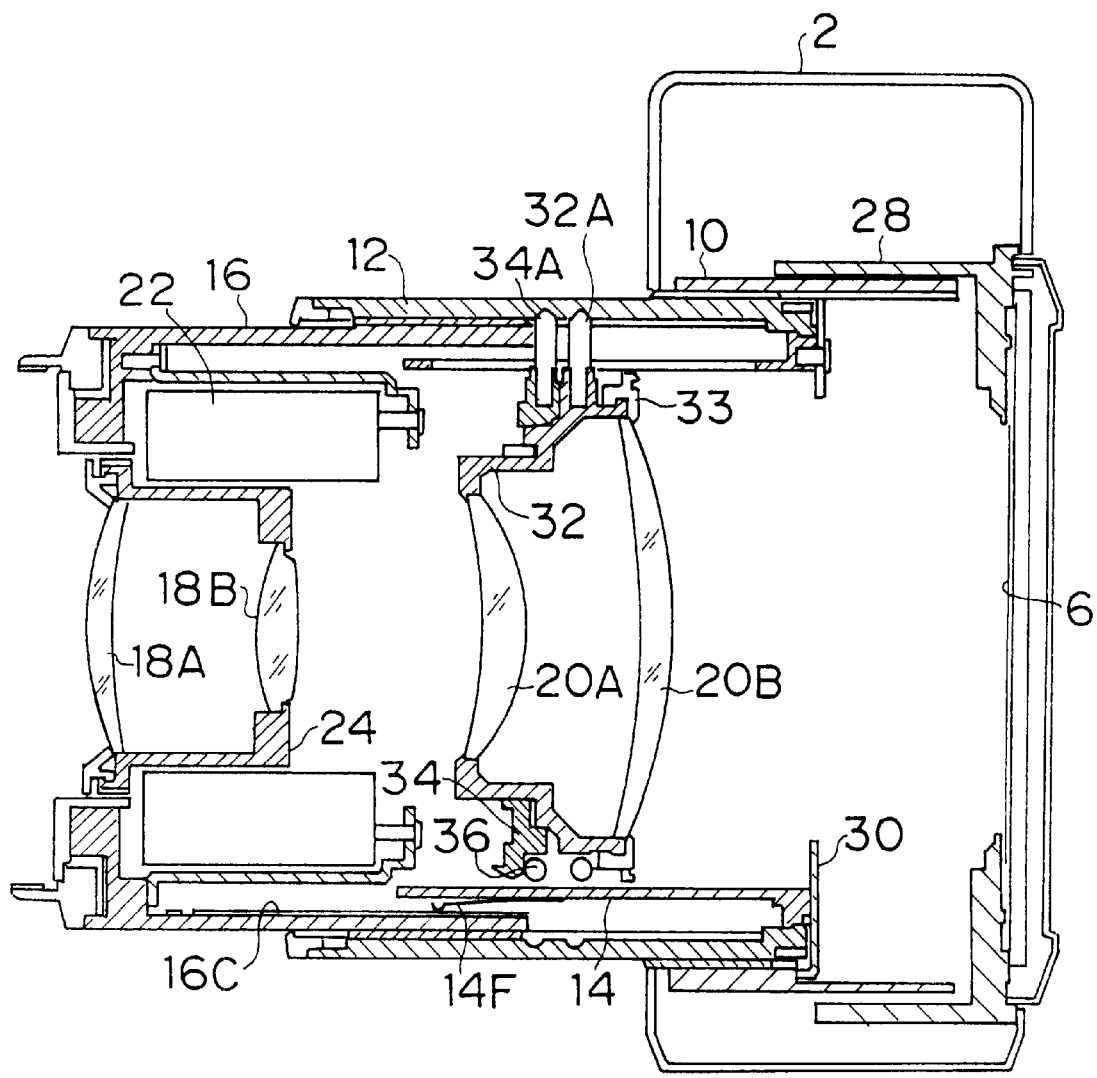
FIG. 2 is a sectional view of the lens barrel at an extending position in the camera.
Figure 3:
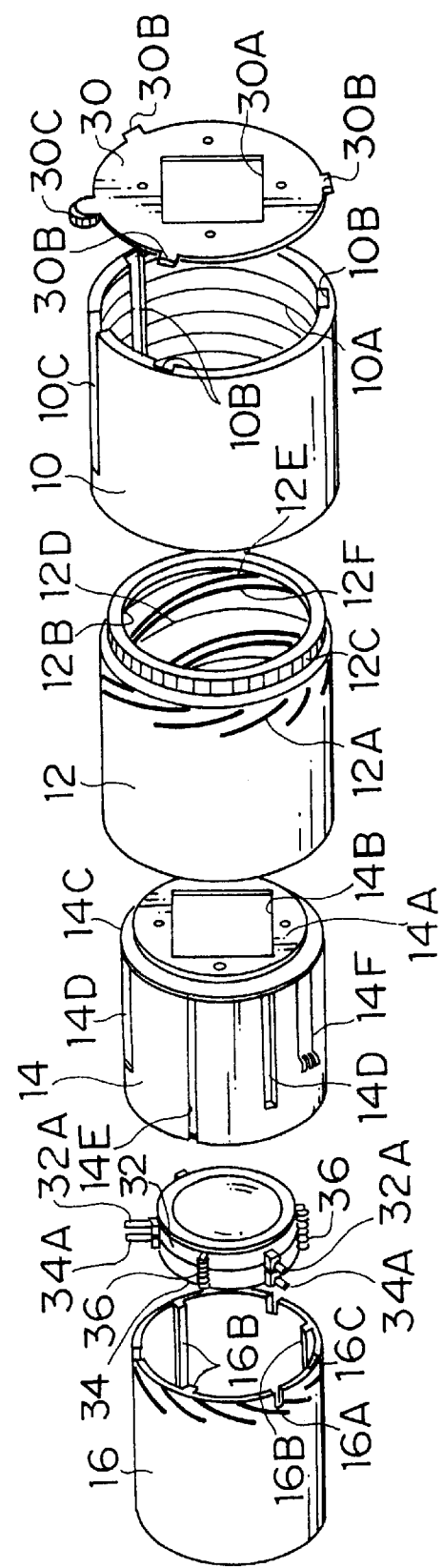
FIG. 3 is an exploded perspective view of the lens barrel.

FIGS. 1 & 2 are sectional views illustrating a lens barrel of a camera according to an embodiment of the present invention at a collapsing position and an extending position, respectively. FIG. 3 is an exploded perspective view of the lens barrel in FIGS. 1 & 2. In the camera in FIGS. 1 & 2, a camera body 2 is integrated with the lens barrel 4. When the camera is not used, the lens barrel 4 is located at the collapsing position as shown in FIG. 1. When the camera is used, the lens barrel 4 moves to the extending position according to the focusing and zooming magnifications as shown in FIG. 2. A film 6 is arranged on a backside of the camera body 2.

The lens barrel 4 comprises a fixed cylinder 10, a rotatable cylinder 12, a key cylinder 14, a front cylinder 16, front group lenses 18A & 18B, rear group lenses 20A & 20B, and a shutter device 22. A front group lens holding frame 24 holds the front group lenses 18A & 18B, and the front cylinder 16 supports the front group lens holding frame 24. The shutter device 22 is fixed to a shutter frame 26 with screws 26A, and the front cylinder 16 holds the shutter frame 26.

The fixed cylinder 10 is attached to a fixing member 28, which is fixed in the camera body 2, so that the fixed cylinder 10 can be fixed in the camera body 2. As shown in FIG. 3, a helicoidal thread 10A is formed on the internal circumferential surface of the fixed cylinder 10, and a helicoidal thread 12A is formed on the external circumferential surface of the rotatable cylinder 12. The rotatable cylinder 12 is fitted in the fixed cylinder 10 so that the helicoidal thread 12A engages with the helicoidal thread 10A. The key cylinder 14 is inserted in the rotatable cylinder 12, and a key plate 30 is fixed with screws to an end face 14A of the key cylinder 14 through a rear opening of the rotatable cylinder 12 so that an opening 30A of the key plate 30 can align with an opening 14B of the end face 14A.

An internal projecting part 12B is formed at the internal circumference of the rear opening of the rotatable cylinder 12. An external projecting part 14C is formed at the external circumference of the rear end of the key cylinder 14. The internal projecting part 12B of the rotatable cylinder 12 is rotatably held between the external projecting part 14C of the key cylinder 14 and the key plate 30 (see FIG. 1). Three key grooves 10B are formed in the internal circumferential surface of the fixed cylinder 10 along an optical axis, and three projections 30B are formed at the external circumference of the key plate 30. The projections 30B engage with the key grooves 10B, thereby preventing the rotation of the key cylinder 14 and the key plate 30. Thus, the rotatable cylinder 12, the key cylinder 14 and the key plate 30 move integrally along the optical axis, and only the rotatable cylinder 12 can rotate whereas the key cylinder 14 and the key plate 30 are prevented from rotating.

A gear 12C is provided at the external circumference of the rear end of the rotatable cylinder 12, and the gear 12C engages with a transmission gear 30C, which is rotatably attached to the key plate 30. The transmission gear 30C connects to a gear train (not illustrated), which is formed at the camera body 2, through an opening 10C formed in the fixed cylinder 10, thereby connecting to a motor (not illustrated) arranged in the camera body 2 through the gear train. Thus, when the motor rotates the rotatable cylinder 12, the rotatable cylinder 12 moves forward or backward along the optical axis depending upon the rotational direction. At the same time, the key cylinder 14 and the key plate 30 as well as the rotatable cylinder 12 move straight forward or backward along the optical axis with the rotation thereof being prevented.

A helicoidal thread 12D and three pairs of cam grooves 12E & 12F are formed in the internal circumferential surface of the rotatable cylinder 12. FIG. 5 is a development showing a part of the cam grooves 12E & 12F formed in the internal circumferential surface of the rotatable cylinder 12. A rear lens group holding frame (hereinafter referred to as a "lens holding frame") 32, which holds the rear group lenses 20A & 20B, has three cam followers 32A on the external circumferential surface thereof. A rear lens group guide member (hereinafter referred to as a "guide member") 34 is arranged in front of the lens holding frame 32, and the guide member 34 and the lens holding frame 32 are drawn toward one another by tension springs 36. The guide member 34 has three cam followers 34A on the external circumferential surface thereof. The lens holding frame 32 and the guide member 34 are arranged in the key cylinder 14. The cam followers 32A of the lens holding frame 32 and the cam followers 34A of the guide member 34 engage with the cam groves 12E & 12F, respectively, through straight grooves 14D, which are formed along the optical axis in the circumference of the key cylinder 14. Three pairs of cam grooves 12E & 12F are formed correspondingly to three pairs of cam followers 32A & 34A. Consequently, when the rotatable cylinder 12 is rotated, the lens holding frame 32 and the guide member 34 are prevented from rotating by the operation of the straight grooves 14D and the cam followers 32A & 34A while the lens holding frame 32 and the guide member 34 are moved along the optical axis within the key cylinder 14 by the operation of the cam grooves 12E & 12F and the cam followers 32A & 34A. The structure and operation of the lens holding frame 32 and the guide member 34 will be described later.

The front cylinder 16 is inserted between the rotatable cylinder 12 and the key cylinder 14, and it is arranged in front of the cam followers 32A of the lens holding frame 32 and the cam followers 34A of the guide member 34. A helicoidal thread 16A, which is formed on the external circumferential surface of the front cylinder 16, engages with the helicoidal thread 12D formed on the internal circumferential surface of the rotatable cylinder 12. Three projecting parts 16B are formed on the internal circumferential surface of the front cylinder 16, and they extend straight along the optical axis. Three key grooves 14E are formed on the external circumferential surface of the key cylinder 14. The projecting parts 16B of the front cylinder 16 slidably engage with the key grooves 14E. Consequently, when the rotatable cylinder 12 is rotated, the front cylinder 16 is prevented from rotating by the operation of the key grooves 14E and the projecting parts 16B while the front group lenses 18A & 18B as well as the front cylinder 16 are moved along the optical axis by the operation of the helicoidal thread 12D and the helicoidal thread 16A. An encoder contact 14F is attached on the external circumferential surface of the key cylinder 14, and an encoder plate 16C on which a predetermined print pattern is formed is attached on the internal circumferential surface of the front cylinder 16 along the optical axis. The encoder contact 14F electrically detects the print pattern on the encoder plate 16C to thereby determine the extending position of the front cylinder 16 (see FIGS. 1 & 2).

FIG. 4 is an exploded perspective view illustrating the structure of the lens holding frame 32 and the guide member 34. As shown in FIG. 4, the lens holding frame 32 holds the rear group lenses 20A & 20B therein, and it is a cylinder that is different in diameter between the front part and the rear part. A rear group press ring 33 is attached to the rear end of the lens holding frame 32, and three hooks 33A are formed on the external circumference of the rear group press ring 33. One end of each tension spring 36 is hooked on each hook 33A. The cam followers 32A project from the external circumferential surface of the lens holding frame 32, and they extend radially. The cam followers 32A engage with the cam grooves 12E, which are formed in the internal circumferential surface of the rotatable cylinder 12, and move along the cam grooves 12E.

The guide member 34 is ring-shaped, and three hooks 34B are formed at the external circumference of the guide member 34. The other end of each tension spring 36 is hooked on each hook 34B. The cam followers 34A project from the external circumference of the guide member 34 at the positions corresponding to the cam followers 32A of the lens holding frame 32. The guide member 34 is fitted on the lens holding frame 32 from the front so that the guide member 34 can slide freely along the optical axis with respect to the lens holding frame 32, and the tension springs 36 are suspended between the hooks 34B of the guide member 34 and the hooks 33A of the rear group press ring 33. Thus, the lens holding frame 32 and the guide member 34 are pressed in such a way as to become closer to each other.

The cam followers 34A of the guide member 34 engage with the cam grooves 12F, each of which is formed along the cam groove 12E, of the rotatable cylinder 12. The interval between the pair of cam grooves 12E & 12F is a little longer than the interval between the pair of cam followers 32A & 34A in the case where the lens holding frame 32 and the guide member 34 become closest to one another. For this reason, the tension spring 36 always presses the cam followers 32A of the lens holding frame 32 against the front edges of the cam groves 12E without fail. Since the guide member 34 moves within the rotatable cylinder 12 while maintaining a constant distance to the lens holding frame 32, the drawing force applied to the lens holding frame 32 is kept constant regardless of the moving direction of the lens holding frame 32.

A description will be given of the operation of the lens barrel, which is constructed in the above-mentioned manner. As shown in FIG. 1, when the lens barrel is located at the collapsing position, the rotatable cylinder 12, the front cylinder 16 and the key cylinder 14 are positioned at their back ends. In this case, the lens holding frame 32 is pressed forward by the tension spring 36 operating between the lens holding frame 32 and the guide member 34, which is pressed backward. The cam followers 32A of the lens holding frame 32 are pressed against the front edges of the cam grooves 12E, and the lens holding frame 32 is pressed forward.

When a power switch of the camera body 2 is turned on, the motor (not illustrated) starts running. The rotational driving force is transmitted to the transmission gear 30C attached to the key plate 30, and the transmission gear 30C rotates the rotatable cylinder 12. Thus, the rotatable cylinder 12 moves forward while rotating, and the key plate 30 and the key cylinder 14 move straightforward in association with the rotatable cylinder 12 while their rotations are prevented. The rotation of the rotatable cylinder 12 causes the front cylinder 16, whose rotation is prevented by the key cylinder 14, to move straightforward due to the operation of the helicoidal threads, and also causes the front group lenses 18A & 18B in the front cylinder 16 to move forward. At the same time, the cam followers 32A & 34A of the lens holding frame 32 and the guide member 34 move forward along the cam grooves 12E & 12F while their rotations are prevented by the key groves 14E of the key cylinder 14. Since the rear group press ring 33 is always pressed forward by the tension springs 36 stretched to the guide member 34, the lens holding frame 32 is always pressed forward.

When the extending positions of the lens barrel are changed by rotating the rotatable cylinder 12 in different directions in the focusing, zooming and other operations, the lens holding frame 32 is always pressed forward regardless of whether it moves forward or backward.

As stated above, the cam groove 12F is formed in the rotatable cylinder 12 along the cam groove 12E, with which the cam follower 32A of the lens holding frame 32 engages, and the tension is applied between the cam follower 34A engaging with the cam groove 12F and the cam follower 32A of the lens holding frame 32. It is therefore possible to make use of a space in the lens barrel, and press the lens holding frame to one side in the simple structure with a constant force regardless of the position of the lens holding frame 32. Moreover, the lens position determining accuracy is improved, and the abovementioned mechanism does not require an extra space even in the compact camera.

In this embodiment, the lens holding frame 32 and the guide member 34 are pressed in such a direction as to become closer to each other, and the lens holding frame 32 is always pressed forward. The present invention, however, should not be restricted to this. The lens holding frame 32 and the guide member 34 may be pressed in such a direction as to become farther from each other by a compression spring for example, and the lens holding frame 32 may be always pressed backward.

Moreover, in this embodiment, the lens holding frame 32 and the guide member 34 are pressed by means of the springs 36. The present invention, however, should not be restricted to this. The lens holding frame 32 and the guide member 34 may be pressed by other means such as magnets.

Furthermore, in this embodiment, the cam followers 32A & 34A, which engage with the cam grooves 12E & 12F of the rotatable cylinder 12, are provided at the lens holding frame 32 and the guide member 34, respectively. The present invention, however, should not be restricted to this. The cam follower engaging with the cam groove 12F may be provided at the lens holding frame 32 without providing the guide member 34. In this case, both of the cam follower engaging with the cam groove 12E and the cam follower engaging with the cam groove 12F are provided at the lens holding frame 32 such that one of the cam followers is slidable along the optical axis and is pressed forward or backward.

As set forth hereinabove, in the lens barrel of the camera according to the present invention, the second cam groove is formed along the first cam groove in the internal circumferential surface of the rotatable cylinder, and the second cam follower is provided at the lens holding frame in such a way as to move freely to along the optical axis. The second cam follower engages with the second cam groove, and there is provided the pressing member that presses the first cam follower and the second cam follower in the direction as to become closer to or farther from each other. It is therefore possible to provide the lens holding frame pressing mechanism in a space within the rotatable cylinder of the lens barrel where the lens holding frame is arranged. This mechanism does not require an extra space. To provide the mechanism, the second cam groove is formed along the first cam groove, with which the lens holding frame engages, and there is provided the pressing member that presses the lens holding frame in one direction with respect to the cam follower engaging with the second cam groove. Thus, the structure is simple. In addition, the pressing member moves while the interval to the lens holding frame is maintained constant, and thus, the lens holding frame can always be pressed to one side by a constant force, and there is only a small change in the load during the rotation of the lens barrel.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens barrel of a camera comprising:
   a lens holding frame for holding a lens, the lens holding frame having a first cam follower;
   a guide member having a second cam follower;
   a rotatable cylinder for supporting the lens holding frame and the guide member therein, the rotatable cylinder being provided with a first cam groove and a second cam groove in an internal circumferential surface thereof, the first cam groove and the second cam groove being along one another, the first cam follower engaging with the first cam groove and the second cam follower engaging with the second cam groove, the lens holding frame and the guide member separately moving within the rotatable cylinder along an optical axis of the lens upon rotating of the rotatable cylinder; and a pressing member for pressing the lens holding frame and the guide member in one of directions as to become closer to one another and as to become farther from one another.

2. The lens barrel of the camera as defined in claim 1, further comprising an unrotatable key cylinder inserted in the rotatable cylinder, the key cylinder having a key groove along the optical axis, wherein the first and second cam followers engage with the key groove slidably along the optical axis and protrude from the key cylinder through the key groove to engage with the first and second cam grooves.

3. The lens barrel of the camera as defined in claim 1, wherein the rotatable cylinder is rotated by a motor and is connected to a fixed cylinder with helicoidal threads, the fixed cylinder being fixed at a camera body, wherein when the motor runs, the rotatable cylinder moves along the optical axis with respect to the fixed cylinder.

4. A lens barrel of a camera comprising:

a lens holding frame for holding a lens, the lens holding frame having a plurality of first cam followers;

a guide ring having the same number of second cam followers as the first cam followers;

a rotatable cylinder for supporting the lens holding frame and the guide ring therein, the rotatable cylinder being provided with the same number of pairs of first and second cam grooves as the first cam followers in an internal circumferential surface thereof, the first cam groove and the second cam groove of each pair being along one another, the first cam followers engaging with the first cam grooves and the second cam followers engaging with the second cam grooves, the lens holding frame and the guide ring separately moving within the rotatable cylinder along an optical axis of the lens upon rotating of the rotatable cylinder; and a pressing member for pressing the lens holding frame and the guide ring in one of directions as to become closer to one another and as to become farther from one another.

5. The lens barrel of the camera as defined in claim 4, wherein:

the first cam followers are arranged on the lens holding frame at regular intervals; and the second cam followers are arranged on the guide ring at regular intervals.

6. The lens barrel of the camera as defined in claim 4, further comprising a plurality of the pressing members arranged between the lens holding frame and the guide ring at regular intervals.

7. The lens barrel of the camera as defined in claim 4, further comprising an unrotatable key cylinder inserted in the rotatable cylinder, the key cylinder having the same number of key grooves as the first cam followers along the optical axis, wherein each pair of the first cam follower and the second cam follower engage with each key groove slidably along the optical axis and protrude from the key cylinder through the key groove to engage with each pair of the first cam groove and the second cam groove.

8. The lens barrel of the camera as defined in claim 4, wherein the rotatable cylinder is rotated by a motor and is connected to a fixed cylinder with helicoidal threads, the fixed cylinder being fixed at a camera body, wherein when the motor runs, the rotatable cylinder moves along the optical axis with respect to the fixed cylinder.

* * * * *